US006889220B2

(12) United States Patent
Wolff et al.

(10) Patent No.: US 6,889,220 B2
(45) Date of Patent: May 3, 2005

(54) METHOD AND APPARATUS FOR ELECTRONIC DOCUMENTS RETRIEVING, DISPLAYING DOCUMENT CLUSTERS REPRESENTING RELATIONSHIP WITH EVENTS

(75) Inventors: Gregory J. Wolff, Mountain View, CA (US); Kurt Piersol, Santa Cruz, CA (US); Dar-Shyang Lee, Fremont, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 10/337,651

(22) Filed: Jan. 6, 2003

(65) Prior Publication Data

US 2003/0126161 A1 Jul. 3, 2003

Related U.S. Application Data

(63) Continuation of application No. 09/322,324, filed on May 28, 1999, now Pat. No. 6,526,398.

(51) Int. Cl.[7] ............................................. G06F 17/30
(52) U.S. Cl. ........................ 707/1; 707/104.1; 707/200; 715/513; 715/526
(58) Field of Search .................. 707/1–10, 200–205, 707/100–104.1, 500.1, 501.1, 511–513, 530–531, 526, 517, 521, 911; 715/501.1, 512, 526; 708/112, 130, 131–134; 382/176–180; 705/8–9; 345/784, 777, 753, 810, 866

(56) References Cited

U.S. PATENT DOCUMENTS 5,592,607 A * 1/1997 Weber et al. ............... 715/863
5,649,182 A  7/1997 Reitz
5,774,867 A  6/1998 Fitzpatrick et al.

(Continued)

FOREIGN PATENT DOCUMENTS

| EP | 0 540 442 A2 | 5/1993 | |
|----|--------------|--------|----|
| EP | 0702322 A2 * | 3/1996 | ...................... 9/68 |
| EP | 0 886 405 A2 | 12/1998 | |
| EP | 1 014 286 A2 | 6/2000 | |
| GB | 2 331 437 A | 5/1999 | |

OTHER PUBLICATIONS

Chakravarthy et al. A constraint–based specification of periodic patterns in time–oriented data, Temporal reprensentation and rasoings, 1999 proceedings, sixth internal workshop, May 1999, pp 29–40.*

Tsuda I et al. Workware : WWW–based chronological document organizer, Computer Human interaction, 1998 proceedings, pp 380–385.*

Christian Seeling, et al. "Analyzing associations of textual and relational daa with a multiple views system", Fraunhofer institut for applied information technology FIT, Germany, 9 pages.*

Wolfgang Weitz et al., << GAPS++ : An internet based petri net modeling and simulation architecture, http://www.aif-b.nni–karlsruhe.de/InfoSys/.*

*Primary Examiner*—Srirama Channavajjala
(74) *Attorney, Agent, or Firm*—Blakely, Sokoloff, Taylor & Zafman LLP

(57) ABSTRACT

A method and apparatus for document management including assigning labels to gaps in document production. The gaps may correspond to events that caused an individual to begin and/or cease production/modification of documents. Such events can be, for example, a vacation, a business trip, a meeting, etc. The labels can be used for document retrieval purposes. In one embodiment predetermined events, either predefined or user-defined, are used to automatically label gaps in document production. In one embodiment, the invention provides links to documents that correspond to gaps in document production where the links can be used for document retrieval purposes.

55 Claims, 5 Drawing Sheets

U.S. PATENT DOCUMENTS

| | | | |
|---|---|---|---|
| 5,842,009 A | | 11/1998 | Borovoy et al. |
| 5,867,822 A | * | 2/1999 | Sankar .................... 705/8 |
| 5,873,108 A | | 2/1999 | Goyal et al. |
| 5,893,127 A | * | 4/1999 | Tyan et al. ............. 715/513 |
| 5,895,470 A | | 4/1999 | Pirolli et al. |
| 5,899,979 A | * | 5/1999 | Miller et al. ............ 705/9 |
| 5,930,792 A | * | 7/1999 | Polcyn ................... 707/9 |
| 5,933,778 A | | 8/1999 | Buhrmann et al. |
| 5,966,718 A | * | 10/1999 | Shibata .................. 715/530 |
| 6,006,227 A | * | 12/1999 | Freeman et al. .......... 707/7 |
| 6,012,075 A | * | 1/2000 | Fein et al. ............. 715/540 |
| 6,016,478 A | | 1/2000 | Zhang et al. |
| 6,047,296 A | | 4/2000 | Wilmott et al. |
| 6,067,552 A | | 5/2000 | Yu |
| 6,085,166 A | * | 7/2000 | Beckhardt et al. ........ 705/9 |
| 6,085,205 A | | 7/2000 | Peairs et al. |
| 6,098,066 A | | 8/2000 | Snow et al. |
| 6,115,718 A | | 9/2000 | Huberman et al. |
| 6,182,066 B1 | * | 1/2001 | Marques ................. 707/5 |
| 6,208,996 B1 | | 3/2001 | Ben-Shachar et al. |
| 6,240,414 B1 | * | 5/2001 | Beizer et al. ............ 707/8 |
| 6,323,883 B1 | * | 11/2001 | Minoura et al. .......... 345/784 |
| 6,470,362 B1 | * | 10/2002 | Eustace et al. ........... 715/500 |
| 6,526,398 B2 | * | 2/2003 | Wolff et al. .............. 707/1 |
| 6,547,831 B1 | * | 4/2003 | Kueny ................... 707/522 |
| 6,658,427 B2 | * | 12/2003 | Kogut-O'Connell et al. ... 707/103 Y |
| 6,671,805 B1 | * | 12/2003 | Brown et al. ............ 713/176 |
| 2002/0165883 A1 | * | 11/2002 | Sans et al. .............. 707/530 |
| 2004/0015785 A1 | * | 1/2004 | Lin ...................... 715/530 |

\* cited by examiner

| Gap Length in Days | End Date | Event |
|---|---|---|
| 26.1 | Tuesday, March 31, 1998 | Attended CEBIT |
| 13.4 | Thursday, May 2, 1996 | Trip to Japan |
| 12.2 | Monday, November 24, 1997 | Attended COMDEX |
| 10.8 | Friday, October 18, 1996 | Attended DAS Workshop |
| 10.7 | Tuesday, January 2, 1996 | Holiday Vacation |
| 10.6 | Monday, July 15, 1996 | Trip to Japan |
| 9.5 | Friday, August 22, 1997 | Attended ICDAR |
| 8.2 | Saturday, June 27, 1998 | Attended Conference |
| 7.0 | Thursday, April 4, 1996 | Attended AIIM |
| 7.0 | Monday, April 28, 1997 | Trip to Japan |

FIG. 3

ND APPARATUS FOR
METHOD AND APPARATUS FOR ELECTRONIC DOCUMENTS RETRIEVING, DISPLAYING DOCUMENT CLUSTERS REPRESENTING RELATIONSHIP WITH EVENTS

This is a continuation of application Ser. No. 09/322,324, filed on May 28, 1999 now U.S. Pat. No. 6,526,398, entitled "METHOD AND APPARATUS FOR USING GAPS IN DOCUMENT PRODUCTION AS RETRIEVAL CUES," and assigned to the corporate assignee of the present invention.

FIELD OF THE INVENTION

The invention relates to document management. More particularly, the invention relates to use of temporal gaps in document production and/or modification to manage documents.

BACKGROUND OF THE INVENTION

Individuals or groups that produce documents typically store the documents according to content, date of modification/creation, title, etc. When an individual wishes to retrieve a document so stored, the individual must retrieve the document according to the storage scheme. However, the individual may not remember the title or date of a document and must inspect a large number of documents in order to retrieve the desired document.

Many document retrieval schemes have been developed to help an individual retrieve one or more desired documents. For example, queries using keywords, phrases, dates of creation, document size, and other characteristics have been implemented to aid in document retrieval. However, individuals often remember events for which, or in response to which, documents were created. The retrieval schemes described above cannot be used to retrieve documents based on events unless the event fits one of the search characteristics.

For example, an individual may have printed a particular document in preparation for a meeting. The individual may remember the date of the meeting and the general content of the document, but not the title of the document, or where the document was stored. Thus, if the individual desired to retrieve the document again at a later date, the individual will likely search many documents before finding the desired document.

What is needed is a document management scheme that allows a user to retrieve documents in a more natural and meaningful manner.

SUMMARY OF THE INVENTION

A method and apparatus for document management is described. One or more gaps in document production are determined. The one or more gaps can be assigned one or more labels. In one embodiment, the one or more labels are used as retrieval cues for accessing documents. In one embodiment, known events (e.g., predetermined dates, user-defined events) are used to generate labels for the one or more gaps. In one embodiment, the invention provides a graphical interface representing gaps in document production, labels and associated documents.

BRIEF DESCRIPTION OF THE DRAWINGS

The invention is illustrated by way of example, and not by way of limitation in the figures of the accompanying drawings in which like reference numerals refer to similar elements.

FIG. 3 is an exemplary table interface for displaying gaps in document production.

DETAILED DESCRIPTION

Figure 1:
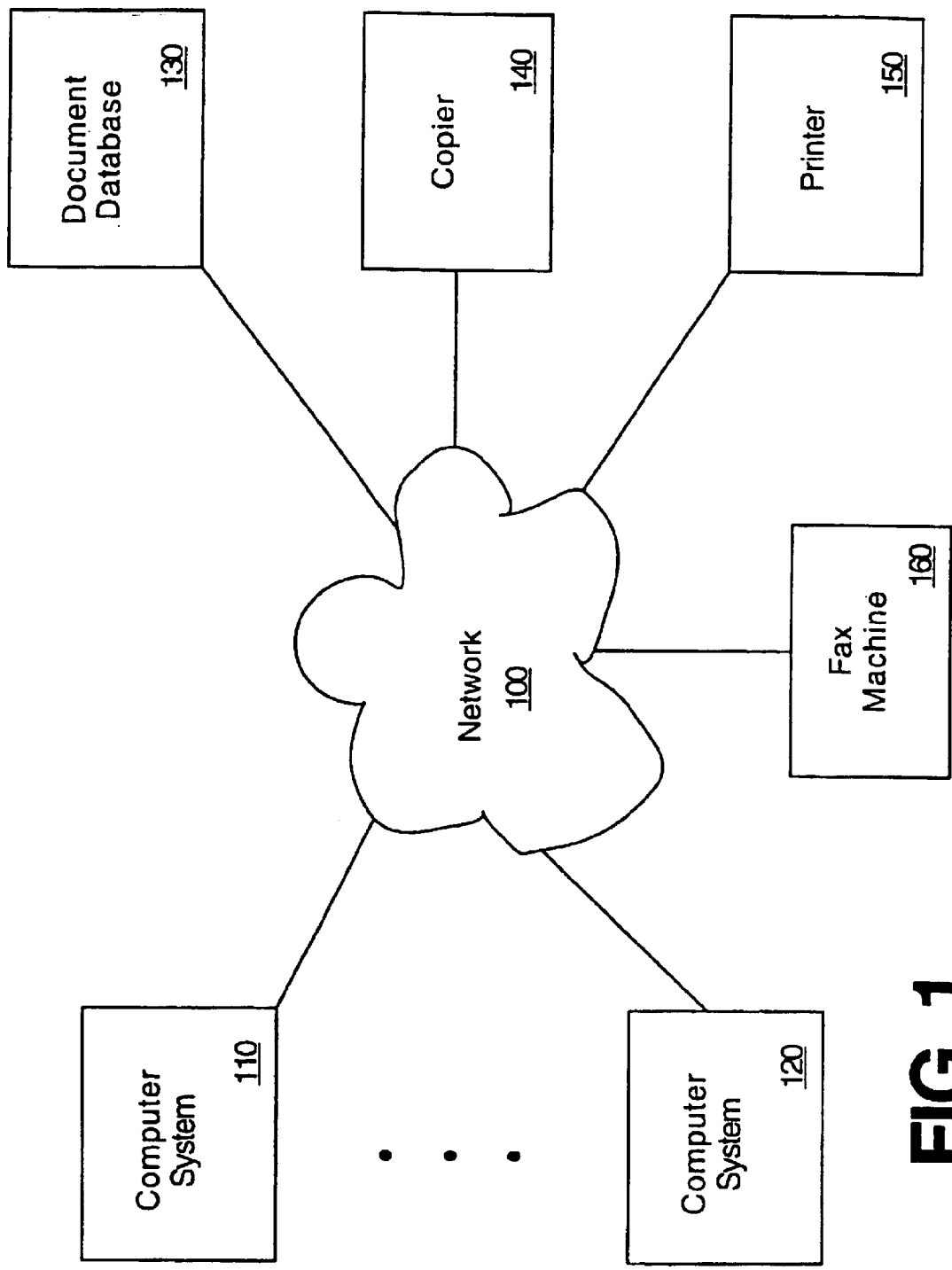
FIG. 1 is an architecture suitable for use in managing documents according to one embodiment of the invention.

A method and apparatus for document management is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

The invention provides a method and apparatus for document management including assigning labels to gaps in document production. The gaps correspond to events that caused an individual to begin and/or cease production/modification of documents. Such events can be, for example, a vacation, a business trip, a meeting, etc. The labels can be used for document retrieval purposes. In one embodiment predetermined events, either predefined or user-defined, are used to automatically label gaps in document production. In one embodiment, the invention provides links to documents that correspond to gaps in document production where the links can be used for document retrieval purposes.

FIG. 1 is an architecture suitable for use in managing documents according to one embodiment of the invention. The architecture of FIG. 1 includes several devices interconnected by a network; however, not all of the devices are required to practice the invention. For example, a fax machine is not required for document management according to the invention; however, documents processed by a fax machine can be managed according to the invention.

Network 100 provides an interconnection between several devices. Network 100 can be, for example, a local area network (LAN), a wide area network (WAN) or other type of interconnection of electronic devices. Network 100 can also represent multiple smaller networks, for example, a group of LANs. Network 100 can be implemented in any manner known in the art.

One or more computer systems (e.g., computer system 110 and computer system 120) can be coupled to network 100. The computer systems allow users to generate, modify, and otherwise manipulate documents managed according to the invention. Documents processed by the computer systems can be, for example, electronic mail, textual documents, graphical documents, documents to be printed, documents to be stored, documents to be transmitted via facsimile, etc. Documents can be processed by any manner known in the art, for example, by using a word processing program such as Word available from Microsoft Corporation of Redmond, Wash.

Documents can be retrieved by the computer systems as described in greater detail below. The documents retrieved can be stored locally on the computer system retrieving the document(s) or documents can be stored on another device that is accessed via network 100.

Document database 130 stores documents managed according to the invention. In one embodiment, document database 130 stored documents processed by devices coupled to network 100. For example, documents stored by the computer systems, documents that are printed, documents that are sent or received via facsimile, are stored by document database 130. In alternative embodiments, certain subsets of all potential documents can be stored by document database 130.

Copier 140 is coupled to network 100 and can produce copies in the ordinary manner where a user places a document in copier 140 to make copies. Documents that are copied by copier 140 are stored in document database 130. Copier 140 can also produce copies of documents stored in document database 130. Documents can be retrieved using copier 140 as described in greater detail below.

Printer 150 is coupled to network 100 and prints hard copies of documents from the computer systems or from document database 130. Similarly, fax machine 160 is coupled to network 100 and communicates facsimile transmissions of documents from the computer systems or from document database 130. Documents received by fax machine 160 are stored in document database 130. Documents can be retrieved by printer 150 and by fax machine 160 as described in greater detail below.

Thus, document database 130 maintains one or more copies of documents processed by the devices coupled to network 100. Users of the various devices coupled to network 100 can retrieve documents from document database 130 for reuse. In one embodiment, users can retrieve documents from document database 130 by interacting with an interface that indicates gaps in document production or in another manner that allows documents to be managed according to gaps in document production and/or modification.

Figure 2:
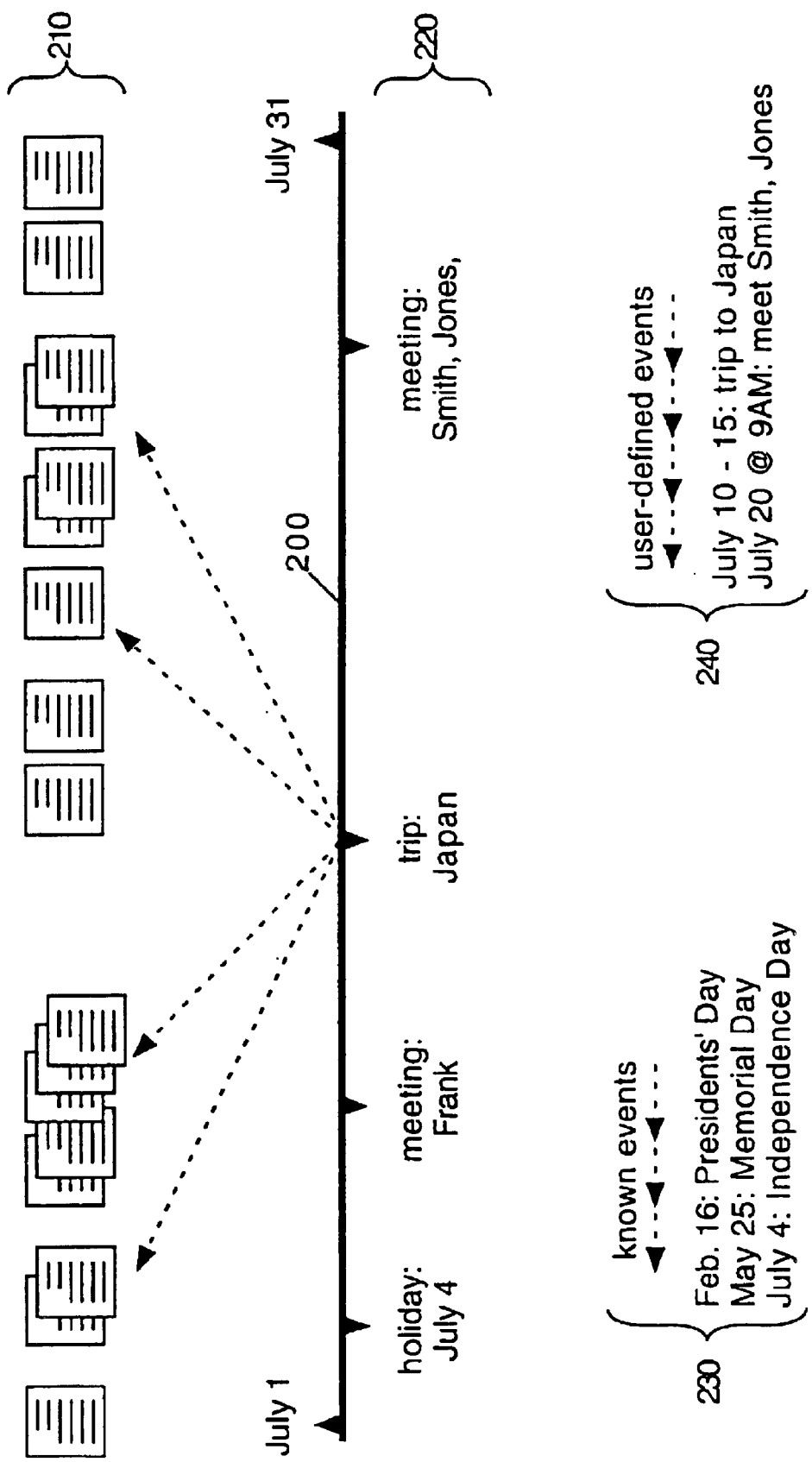
FIG. 2 is an exemplary graphical interface for displaying gaps in document production.

FIG. 2 is an exemplary graphical interface for displaying gaps in document production. The interface of FIG. 2 corresponds to a one month period (July); however, other periods of time can be used. The period of time of interest can be determined based, at least in part, on the size of the gaps used for retrieval purposes. For example, when gaps are measured in days, many days can be displayed, but when gaps are measured in hours, fewer days are displayed.

Timeline 200 corresponds to a period of time during which gaps in document production are displayed. In one embodiment, timeline 200 is user-modifiable both as to the period of time displayed and to the starting and/or ending dates displayed.

Icons 210 represent documents generated and/or modified during the time period represented by timeline 200. Icons 210 can represent the corresponding documents or groups of documents in any appropriate manner. In one embodiment, selecting an icon with a cursor control or other device causes the corresponding document(s) to be retrieved. In an alternative embodiment, selecting an icon causes the corresponding document(s) to be previewed.

Labels 220 correspond to gaps in document production. Labels 220 can indicate correlation with known events 230 (e.g., Presidents' Day, Memorial Day, Independence Day), with user-defined events 240 (e.g., a business trip, a meeting), or to no particular known event (e.g., user was reading hard copy documentation rather than generating/modifying documents).

In one embodiment labels 220 are generated automatically by a document management device (e.g., a computer system, a document database, etc.). Gaps are compared to known events 230 and to user-defined events 240 to determine whether any of the identified gaps in document production correspond to one or more of the events. If so, the gap is labeled with one of the events. Otherwise the gap is given a generic label (e.g., gap1).

In one embodiment, document production/modification gaps for multiple individuals are used to label gaps. Thus, team meetings, official holidays, or other events can be more accurately identified. However, this "collaborative labeling" is not required to practice the invention.

In one embodiment documents that include the dates and/or times that correspond to the beginning or end of a gap are considered to be related to the gap. For example, if a user generates an e-mail message describing a meeting to occur at a particular time, that message is considered to be related to the gap and is linked or otherwise associated with the gap.

Similarly, if a location or topic of a meeting or other event is known, documents having related key words can be linked to the corresponding gap. For example, if the meeting with Smith and Jones on July 20 was at corporate headquarters, documents generated or modified near the gap with the phrase "corporate headquarters" or the address of the corporate headquarters can be identified with the appropriate gap.

If an individual has an electronic calendar, personal digital assistant (PDA), or other electric device to record events, that device can be used to label gaps in document production. For example, if an individual uses an electronic calendar, events recorded on the electronic calendar can be used as user-defined events that are used for labeling gaps in document production/modification.

In one embodiment when a user defines a user-defined event, the user can also define a time window around the event that extends the gap. For example, a user might schedule a phone call at 10:00 a.m. on a particular day and might print or copy documents during the phone call. However, the user may wish to have a gap associated with the phone call. To provide a gap to be associated with the phone call, the user can extend the gap to a predetermined period (e.g., one hour).

The resolution of an event display timeline, such as the timeline of FIG. 2, can be user selectable. The user can also be allowed to "zoom in" or "zoom out" from the timeline to display a different number of gap labels. Table displays can be similarly user configurable.

FIG. 3 is an exemplary table interface for displaying gaps in document production. In the example of FIG. 3, underlined table entries correspond to Hypertext Markup Language (HTML) links; however, use of HTML or other links is not required to practice the invention.

The table of FIG. 3 includes three columns (Gap Length in Days, End Date, and Event) to present gap information. In alternative embodiments, the table can have more and/or different columns. For example, the table can include a column for group activities, or for the number of documents produced prior to the gap.

Gap length column 300 includes a gap length for each of the gaps listed. In the embodiment of FIG. 3 the gap length is listed in days; however, other time periods, for example, hours, four-hour blocks, 30-minute blocks can also be used to describe gap length. In one embodiment, the granularity of gap lengths can be adjusted by a user.

In the example of FIG. 3, gap lengths are not used as links; however, gap lengths can be used as links. For example, gap lengths can be used to link to a calendar, documents corresponding to the gap, etc. The gap lengths in column can also provide a link to a graphical interface, such as the interface of FIG. 2.

In one embodiment, end date column 310 includes an ending date for each gap listed in gap length column 300. In an alternative embodiment, column 310 lists starting dates for each gap listed in gap length column 300. In one embodiment, the dates listed in column 310 are links to other information. For example, the dates can be links to a calendar entry, to documents corresponding to the gap, to a graphical interface such as the interface of FIG. 2. In an alternative embodiment, the dates in column 310 provide date information and are not links to other documents, interfaces, data, etc.

In one embodiment, one or more of the entries in event column 320 are links. The information listed in event column 320 can be obtained, for example, from a calendar belonging to the person(s) whose gaps in document production are listed in the table of FIG. 3. In one embodiment, the links in column 320 are links to documents related to the gap corresponding to the link. For example, the "COMDEX" link can be a link to some or all of the documents generated and/or modified near the gap corresponding to the COMDEX link. In an alternative embodiment, the COMDEX link is a link to a World Wide Web page or other document related to COMDEX.

In one embodiment, matching documents corresponding to gaps with events or labels is accomplished by using the cosine measure. The cosine measure can be used for other matching operations as well. The cosine measure is described in greater detail in "Information Storage and Retrieval" by Robert R. Korfhage, published by Wiley Computer Publishing (1997) at pages 84–86. Briefly, the cosine measure is a measure of the angle between vectors representing two documents (e.g., a document and a query, document to document comparison). The cosine measure is defined as $$\sigma(D, Q) = \frac{\sum_k (t_k \times q_k)}{\sqrt{\sum_k (t_k)^2} \times \sqrt{\sum_k (q_k)^2}} \qquad \text{(Equation 1)}$$

where $t_k$ is the value of term k in the first document and $q_k$ is the value of term k in the second document. In mathematical terms, Equation 1 is the inner product of the first document and the second document, normalized by vector length. The cosine measure ranges from 1 for the highest similarity to 0 for the lowest similarity.

In one embodiment, the labels in event column 320 are generated automatically by analyzing the documents generated before and/or after the corresponding gap. Labels in event column 320 can also be supplied by a user in order to provide labels that are more meaningful to the user. Also, some combination of automatic labels and user-generated labels can be provided.

Automatic labels can be generated by text processing for keywords. For example, keywords such as "attended," "visit," "meet," "discuss," can be used to identify a purpose for the document. Lists of proper nouns, for example, geographical names, personal names, and event names can be used as keywords. Groups of words, phrases or sentences near gap dates can also be selected as labels.

In one embodiment, confidence values are calculated for automatically derived gap labels. This can be done, for example, with a heuristically derived weight value that includes the number of words derived from keyword lists. For example, "visit El Segundo" have a higher confidence value than "visit El Segundo with Steve" because the second phrase requires at least a grammatical transformation. Natural language processing technology can also be used to generate automatic labels.

In one embodiment, the user interface (e.g., the graphical interface of FIG. 2, the table of FIG. 3) used to provide gap information to a user includes user-configurable controls to select automatic labels, user-defined labels, or some combination of automatic labels and user-defined labels. Calendar events or user-defined events can be used to generate labels. In one embodiment, for automatic labels, confidence values above a user-selectable threshold value are used as labels.

Figure 4:
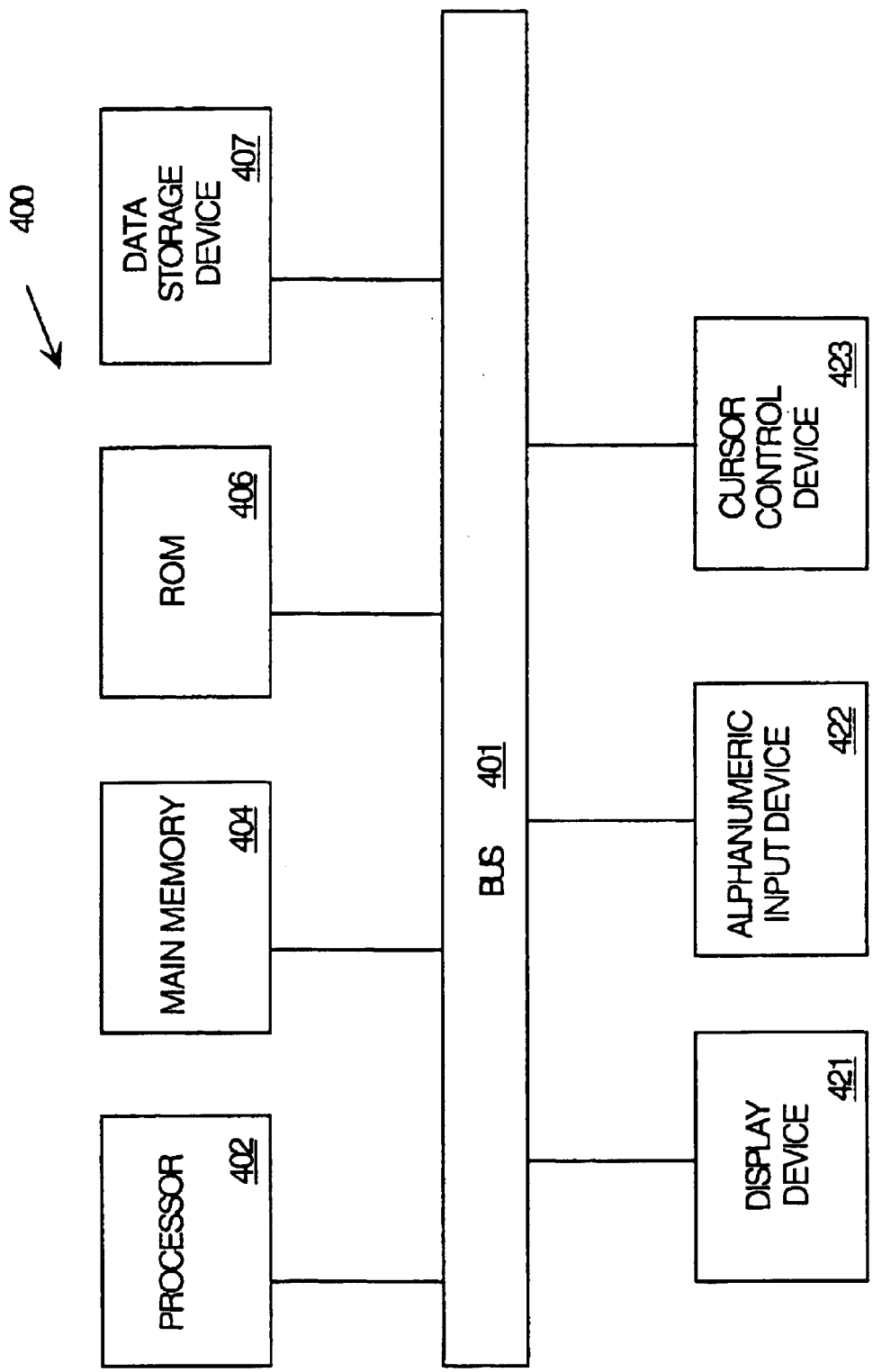
FIG. 4 is a block diagram of a system suitable for use with the invention.

FIG. 4 is a block diagram of a system suitable for use with the invention. System 400 can be any of the devices coupled to network 100 as described with respect to FIG. 1 (e.g., computer system, document database, copier). System 400 can also be another electronic device not described with respect to FIG. 1 (e.g., electronic calendar, PDA).

System 400 includes bus 401 or other communication device to communicate information and processor 402 coupled to bus 401 to process information. While system 400 is illustrated with a single processor, system 400 can include multiple processors and/or co-processors. System 400 further includes random access memory (RAM) or other dynamic storage device 404 (referred to as main memory), coupled to bus 401 to store information and instructions to be executed by processor 402. Main memory 404 also can be used to store temporary variables or other intermediate information during execution of instructions by processor 402.

System 400 also includes read only memory (ROM) and/or other static storage device 406 coupled to bus 401 to store static information and instructions for processor 402. Data storage device 407 is coupled to bus 401 to store information and instructions. Data storage device 407 such as a magnetic disk or optical disc and corresponding drive can be coupled to system 400.

System 400 can also be coupled via bus 401 to display device 421, such as a cathode ray tube (CRT) or liquid crystal display (LCD), to display information to a computer user. Alphanumeric input device 422, including alphanumeric and other keys, is typically coupled to bus 401 to communicate information and command selections to processor 402. Another type of user input device is cursor control 423, such as a mouse, a trackball, or cursor direction keys to communicate direction information and command selections to processor 402 and to control cursor movement on display 421.

One embodiment of the present invention is related to the use of system 400 to generate labels for gaps in document production and/or modification. According to one embodiment, label generation is performed by system 400 in response to processor 402 executing sequences of instructions contained in main memory 404. Instructions are provided to main memory 404 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Figure 5:
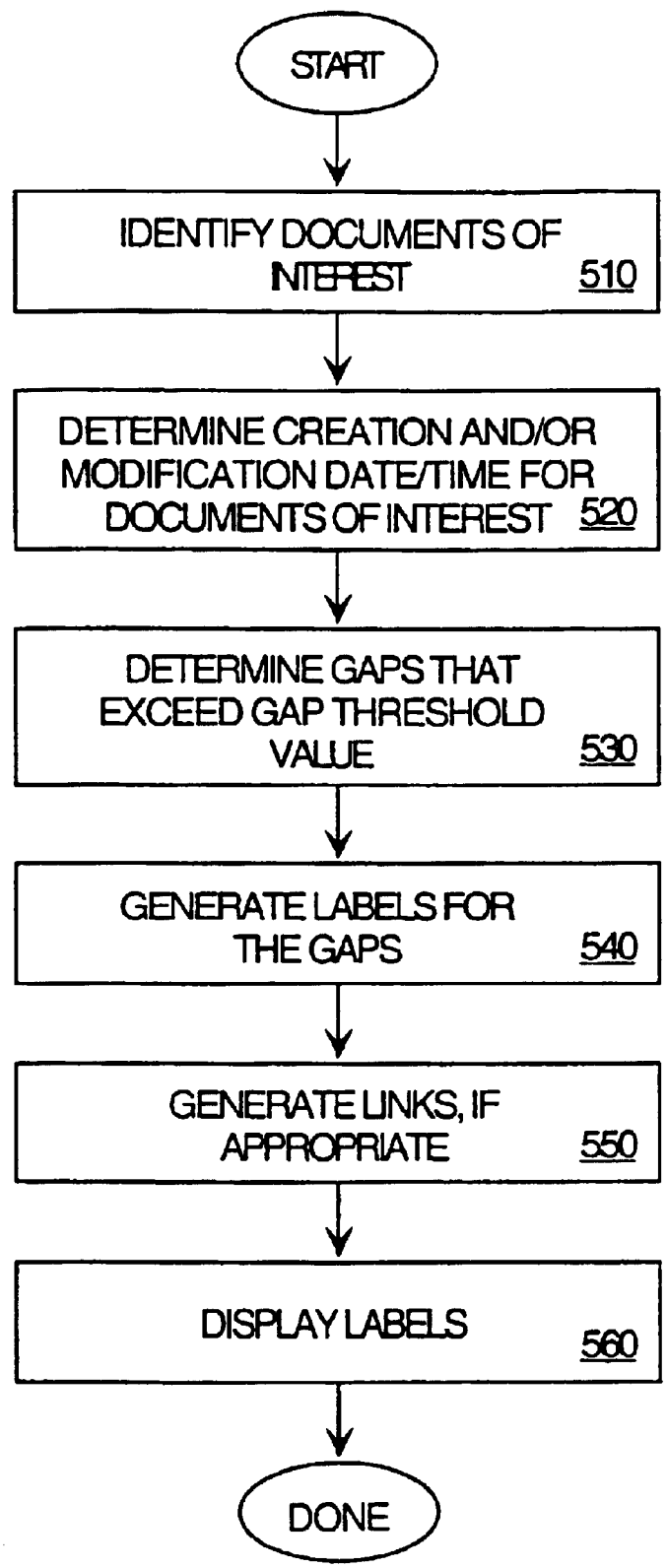
FIG. 5 is a flow chart for performing gap analysis according to one embodiment of the invention.

FIG. 5 is a flow chart for performing gap analysis according to one embodiment of the invention. In one embodiment, documents of interest are identified at 510. The documents of interest can be, for example, all of the documents created and/or modified by a particular user, documents created within a certain range of dates, particular types of documents.

The creation and/or modification dates/times are determined for the documents of interest at 520. Any combination of creation and/or modification dates as well as creation and/or modification times and other temporal information related to gaps in document production and/or modification can be used. From the dates and/or times related to the documents of interest the gaps are determined.

The gaps that exceed a gap threshold are determined at 530. The gap threshold can be a predetermined value, or the gap threshold can be a user-defined value. For example, if an individual is interested in business travel, the gap threshold can be set at one day, so that gaps are identified for periods of one day or more in which documents were not generated and/or modified. Other gap thresholds can also be used.

In one embodiment, recurring gaps, (e.g., weekends) are filtered out and do not result in generation of a label. The gap threshold can also be determined through statistical analysis of documents. For example, gaps of a length greater than two standard deviations above the normal gap size can be used to generate a label, or otherwise indicate a gap in document production.

Labels are generated for the gaps at 540. As described above, labels can be generated automatically or labels can be generated based, at least in part, on user input. Labels can also be user modifiable.

Links are generated, if appropriate, at 550. As described in greater detail above, links can be to specific documents, to a preview of documents, to a user interface, to a table, or to other configurations that are useful for managing documents. The links can be HTML links or other types of links. Links are not required to practice the invention.

The labels are displayed at 560. The labels can be displayed as a graphical user interface, such as the timeline of FIG. 2, or the labels can be displayed as a table, such as the table of FIG. 3. The labels can also be displayed in another manner.

Labels can be used to as part of a textual database query to manage electronic documents. For example, the following queries can be used to retrieve documents: "within one week of COMDEX", "before COMDEX", "after COMDEX", "between ICDAR and COMDEX", etc. The label can be used, for example, as a start date or and end data for a document query.

Other textual queries, for example, "near COMDEX" can also be supported. "Nearness" can be defined, for example, as a predetermined period of time (e.g., a week, a month), based on the length of the gap (e.g., the longer the gap the longer the time period that is "near"), based on statistical analysis (e.g., within one standard deviation).

Document queries can also be defined in terms of the labels, for example, "between(gap COMDEX−1 week) and (gap ICDAR+1 week)." The labels are operands within an arithmetic operation used for document management. Other queries can also be implemented using labels as described herein.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer implemented method for retrieving electronic documents in a data processing system, the method comprising:

determining a time period associated with an event;

identifying one or more documents previously stored in a storage within the time period, at least one of the one or more documents being associated with the event; and displaying graphical representations of the one or more documents chronologically in a manner representing the time period, the graphical representations being spatially arranged into one or more clusters representing relationships with the event, each cluster being associated with at least one of the one or more documents, and each of the graphical representations including a link linking the corresponding graphical representation with at least one of the one or more documents, wherein the at least one document is retrievable in response to an activation of the link.

2. The method of claim 1, further comprising:

receiving an activation of at least one graphical representation from the displayed graphical representations; and retrieving one or more documents associated with the at least one graphical representation in response to the activation.

3. The method of claim 2, further comprising displaying the one or more documents in one of a preview and a full view of the respective documents.

4. The method of claim 1, wherein an amount of space displayed between two of the graphical representations represents a difference of relationship with respect to the event.

5. The method of claim 1, wherein the event is identified via an electronic message received from a remote location over a network.

6. The method of claim 5, wherein the time period is determined based in part on an arrival time of the electronic message.

7. The method of claim 5, wherein the event is described by at least a portion of content of the electronic message.

8. The method of claim 1, wherein the event is recorded via an electronic organizer.

9. The method of claim 1, further comprising displaying a timeline representing the time period, the timeline including one or more labels for providing identification information corresponding to one or more events within the time period, wherein the graphical representations of the one or more documents are displayed with respect to the timeline chronologically.

10. The method of claim 1, further comprising displaying a calendar view associated with the time period, wherein the graphical representations of the one or more documents are displayed chronologically within the calendar view.

11. The method of claim 10, wherein the graphical representations are displayed from the calendar view to a timeline view in response to an input received from a user.

12. The method of claim 1, wherein the graphical representations are displayed with a first resolution, which represents a first detailed level of the time period, and further comprising:

displaying the graphical representations with a second resolution in response to an activation at a location of the graphical representations having the first resolution, the second resolution representing a second detailed level of the time period.

13. The method of claim 12, wherein at least one of the graphical representations is displayed in a different resolution in the second resolution than in the first resolution.

14. The method of claim 12, wherein at least one of the graphical representations is filtered out when the graphical representations are displayed with the second resolution, wherein the filtered out graphical representation is redisplayed when the graphical representations are displayed with the first resolution.

15. The method of claim 12, wherein at least one of the graphical representations is displayed when the graphical representations are displayed with the second resolution, wherein the at least one displayed graphical representation is not displayed when the graphical representations are displayed with the first resolution.

16. The method of claim 1, wherein each the displayed graphical representations includes a link linking with one or more documents.

17. The method of claim 1, further comprising filtering out some of the one or more documents based on a threshold representing a relevancy of the event.

18. The method of claim 1, wherein the graphical representations of the one or more documents are displayed in a resolution corresponding to a relevancy between the respective document and the event.

19. A machine-readable medium having executable code to cause a machine to perform a method for retrieving electronic documents, the method comprising:

determining a time period associated with an event;

identifying one or more documents previously stored in a storage within the time period, at least one of the one or more documents being associated with the event; and displaying graphical representations of the one or more documents chronologically in a manner representing the time period, the graphical representations being spatially arranged into one or more clusters representing relationships with the event, each cluster being associated with at least one of the one or more documents, and each of the graphical representations including a link linking the corresponding graphical representation with at least one of the one or more documents, wherein the at least one document is retrievable in response to an activation of the link.

20. The machine-readable medium of claim 19, wherein the method further comprises:

receiving an activation of at least one graphical representation from the displayed graphical representations; and retrieving one or more documents associated with the at least one graphical representation in response to the activation.

21. The machine-readable medium of claim 20, wherein the method further comprises displaying the one or more documents in one of a preview and a full view of the respective documents.

22. The machine-readable medium of claim 19, wherein an amount of space displayed between two of the graphical representations represents a difference of relationship with respect to the event.

23. The machine-readable medium of claim 19, wherein the event is identified via an electronic message received from a remote location over a network.

24. The machine-readable medium of claim 23, wherein the time period is determined based in part on an arrival time of the electronic message.

25. The machine-readable medium of claim 23, wherein the event is described by at least a portion of content of the electronic message.

26. The machine-readable medium of claim 19, wherein the event is recorded via an electronic organizer.

27. The machine-readable medium of claim 19, wherein the method further comprises displaying a timeline representing the time period, the timeline including one or more labels for providing identification information corresponding to one or more events within the time period, wherein the graphical representations of the one or more documents are displayed with respect to the timeline chronologically.

28. The machine-readable medium of claim 19, wherein the method further comprises displaying a calendar view associated with the time period, wherein the graphical representations of the one or more documents are displayed chronologically within the calendar view.

29. The machine-readable medium of claim 28, wherein the graphical representations are displayed from the calendar view to a timeline view in response to an input received from a user.

30. The machine-readable medium of claim 19, wherein the graphical representations are displayed with a first resolution, which represents a first detailed level of the time period, and the method further comprises:

displaying the graphical representations with a second resolution in response to an activation at a location of the graphical representations having the first resolution, the second resolution representing a second detailed level of the time period.

31. The machine-readable medium of claim 30, wherein at least one of the graphical representations is displayed in a different resolution in the second resolution than in the first resolution.

32. The machine-readable medium of claim 30, wherein at least one of the graphical representations is filtered out when the graphical representations are displayed with the second resolution, wherein the filtered out graphical representation is redisplayed when the graphical representations are displayed with the first resolution.

33. The machine-readable medium of claim 30, wherein at least one of the graphical representations is displayed when the graphical representations are displayed with the second resolution, wherein the at least one displayed graphical representation is not displayed when the graphical representations are displayed with the first resolution.

34. The machine-readable medium of claim 19, wherein each the displayed graphical representations includes a link linking with one or more documents.

35. The machine-readable medium of claim 19, wherein the method further comprises filtering out some of the one or more documents based on a threshold representing a relevancy of the event.

36. The machine-readable medium of claim 19, wherein the graphical representations of the one or more documents are displayed in a resolution corresponding to a relevancy between the respective document and the event.

37. An apparatus for retrieving electronic documents, comprising:

means for determining a time period associated with an event;

means for identifying one or more documents previously stored in a storage within the time period, at least one of the one or more documents being associated with the event; and means for displaying graphical representations of the one or more documents chronologically in a manner representing the time period, the graphical representations being spatially arranged into one or more clusters representing relationships with the event, each cluster being associated with at least one of the one or more documents, and each of the graphical representations including a link linking the corresponding graphical representation with at least one of the one or more documents, wherein the at least one document is retrievable in response to an activation of the link.

38. The apparatus of claim 37, further comprising:

means for receiving an activation of at least one graphical representation from the displayed graphical representations; and means for retrieving one or more documents associated with the at least one graphical representation in response to the activation.

39. The apparatus of claim 38, further comprising means for displaying the one or more documents in one of a preview and a full view of the respective documents.

40. The apparatus of claim 37, wherein an amount of space displayed between two of the graphical representations represents a difference of relationship with respect to the event.

41. The apparatus of claim 37, wherein the event is identified via an electronic message received from a remote location over a network.

42. The apparatus of claim 41, wherein the time period is determined based in part on an arrival time of the electronic message.

43. The apparatus of claim 41, wherein the event is described by at least a portion of content of the electronic message.

44. The apparatus of claim 37, wherein the event is recorded via an electronic organizer.

45. The apparatus of claim 37, further comprising means for displaying a timeline representing the time period, the timeline including one or more labels for providing identification information corresponding to one or more events within the time period, wherein the graphical representations of the one or more documents are displayed with respect to the timeline chronologically.

46. The apparatus of claim 37, further comprising means for displaying a calendar view associated with the time period, wherein the graphical representations of the one or more documents are displayed chronologically within the calendar view.

47. The apparatus of claim 46, wherein the graphical representations are displayed from the calendar view to a timeline view in response to an input received from a user.

48. The apparatus of claim 37, wherein the graphical representations are displayed with a first resolution, which represents a first detailed level of the time period, and further comprising:

means for displaying the graphical representations with a second resolution in response to an activation at a location of the graphical representations having the first resolution, the second resolution representing a second detailed level of the time period.

49. The apparatus of claim 48, wherein at least one of the graphical representations is displayed in a different resolution in the second resolution than in the first resolution.

50. The apparatus of claim 48, wherein at least one of the graphical representations is filtered out when the graphical representations are displayed with the second resolution, wherein the filtered out graphical representation is redisplayed when the graphical representations are displayed with the first resolution.

51. The apparatus of claim 48, wherein at least one of the graphical representations is displayed when the graphical representations are displayed with the second resolution, wherein the at least one displayed graphical representation is not displayed when the graphical representations are displayed with the first resolution.

52. The apparatus of claim 37, wherein each the displayed graphical representations includes a link linking with one or more documents.

53. The apparatus of claim 37, further comprising means for filtering out some of the one or more documents based on a threshold representing a relevancy of the event.

54. The apparatus of claim 37, wherein the graphical representations of the one or more documents are displayed in a resolution corresponding to a relevancy between the respective document and the event.

55. A data processing system, comprising:

a processor; and a memory coupled to the processor to store instructions that causes the processor to perform the operations of presenting a presentation, the operations including:

determining a time period associated with an event;

identifying one or more documents previously stored in a storage within the time period, at least one of the one or more documents being associated with the event; and displaying graphical representations of the one or more documents chronologically in a manner representing the time period, the graphical representations being spatially arranged into one or more clusters representing relationships with the event, each cluster being associated with at least one of the one or more documents, and each of the graphical representations including a link linking the corresponding graphical representation with at least one of the one or more documents, wherein the at least one document is retrievable in response to an activation of the link.

\* \* \* \* \*